(12) United States Patent
Kim et al.

(10) Patent No.: US 7,642,746 B2
(45) Date of Patent: Jan. 5, 2010

(54) METHOD OF PREPARING BATTERY CORE PACK

(75) Inventors: Hyeongchan Kim, Seoul (KR); Sain Park, Anyang-si (KR); Yong-ho Cho, Yongin-si (KR)

(73) Assignee: LG Chem, Ltd. (KR)

( * ) Notice: Subject to any disclaimer, the term of this patent is extended or adjusted under 35 U.S.C. 154(b) by 404 days.

(21) Appl. No.: 11/561,033

(22) Filed: Nov. 17, 2006

(65) Prior Publication Data
US 2007/0126394 A1 Jun. 7, 2007

(30) Foreign Application Priority Data
Dec. 2, 2005 (KR) .................. 10-2005-0116659

(51) Int. Cl.
*H02J 7/00* (2006.01)
*H01R 3/00* (2006.01)

(52) U.S. Cl. .................. 320/112; 439/500; 439/627

(58) Field of Classification Search ........... 320/107, 320/112, 113; 429/7, 96, 98, 99, 100, 123, 429/149, 152, 156, 157, 158, 160, 161, 162; 29/592.1, 623.1; 439/500, 627; D13/103, D13/104, 119, 120, 121
See application file for complete search history.

(56) References Cited

U.S. PATENT DOCUMENTS

| 5,977,746 | A * | 11/1999 | Hershberger et al. ........ 320/112 |
| 7,008,720 | B2 * | 3/2006 | Shimamura et al. ......... 429/179 |
| 7,074,517 | B2 * | 7/2006 | Higashino .................... 429/66 |
| 7,276,313 | B2 * | 10/2007 | Watanabe et al. ........... 429/159 |
| 2003/0006731 | A1 * | 1/2003 | White et al. ................ 320/112 |
| 2003/0170535 | A1 * | 9/2003 | Watanabe et al. ........... 429/158 |
| 2005/0123828 | A1 * | 6/2005 | Oogami et al. .............. 429/152 |
| 2005/0132562 | A1 * | 6/2005 | Saito et al. ................. 29/623.5 |
| 2006/0183017 | A1 * | 8/2006 | Kanai ......................... 429/120 |

* cited by examiner

*Primary Examiner*—Edward Tso
*Assistant Examiner*—M'Baye Diao
(74) *Attorney, Agent, or Firm*—Cantor Colburn LLP (57) ABSTRACT

Disclosed herein is a method of manufacturing a battery core pack having a plurality of unit cells, especially a plurality of cylindrical batteries, which are connected with each other by connecting members. According to the present invention, the structure of the battery core pack can be easily modified by merely changing the combination of the connecting members without manufacturing additional connecting members. Consequently, common use of the connecting members is possible.

12 Claims, 6 Drawing Sheets

METHOD OF PREPARING BATTERY CORE PACK

FIELD OF THE INVENTION

The present invention relates to a method of manufacturing a battery core pack, and, more particularly, to a method of manufacturing a battery core pack having a plurality of unit cells, especially a plurality of cylindrical batteries, wherein the structure of the battery core pack is easily modified by changing the combination of connecting members having specific constructions.

BACKGROUND OF THE INVENTION

As mobile devices have been increasingly developed, and the demand of such mobile devices has increased, the demand of secondary batteries has also sharply increased as an energy source for the mobile devices.

Depending upon kinds of external devices in which the secondary batteries are used, the secondary batteries may be used in the form of a single battery or in the form of a battery pack having a plurality of unit cells electrically connected with each other. For example, small-sized devices, such as mobile phones, can be operated for a predetermined period of time with the output and the capacity of one battery. On the other hand, a battery pack needs to be used in medium- or large-sized devices, such as laptop computers, portable digital versatile disc (DVD) players, small-sized personal computers (PCs), electric vehicles, and hybrid electric vehicles, because high output and large capacity are necessary for the medium- or large-sized devices.

The battery pack is manufactured by connecting a protection circuit to a battery core pack having a plurality of unit cells connected in series and/or in parallel with each other. When prismatic batteries or pouch-shaped batteries are used as the unit cells, the prismatic batteries or the pouch-shaped batteries are stacked one on another such that large-sized surfaces of the prismatic batteries or the pouch-shaped batteries face each other, and then electrode terminals of the prismatic batteries or the pouch-shaped batteries are connected with each other by connecting members, such as bus bars. Consequently, when a three-dimensional battery pack having a hexahedral structure is to be manufactured, the prismatic batteries or the pouch-shaped batteries are favorable as the unit cells.

On the other hand, cylindrical batteries generally have electric capacities larger than the prismatic batteries or the pouch-shaped batteries. However, it is difficult to arrange the cylindrical batteries in a stacked structure due to the outer appearance of the cylindrical batteries. When the battery pack is constructed generally in a line-type structure or in a plane-type structure, though, the cylindrical batteries are structurally more advantageous than the prismatic batteries or the pouch-shaped batteries.

Consequently, a battery pack having a plurality of cylindrical batteries connected in parallel and in series with each other is widely used in laptop computers, portable DVD players, and portable PCs. For example, the battery pack is usually constructed in a 2P (parallel)-3S (series) line-type structure, a 2P-3S plane-type structure, a 2P-4S line-type structure, or a 2P-4S plane-type structure.

The parallel connection structure is accomplished by arranging two or more cylindrical batteries in the lateral direction while electrode terminals of the cylindrical batteries are oriented in the same direction, and connecting the electrode terminals of the cylindrical batteries with each other using connecting members by welding. Hereinafter, the cylindrical batteries connected in parallel will be referred to as "banks."

The series connection structure is accomplished by arranging two or more cylindrical batteries in the longitudinal direction such that electrode terminals of the cylindrical batteries having opposite polarities are successively disposed one after another, or arranging two or more cylindrical batteries in the lateral direction while electrode terminals of the cylindrical batteries are oriented in opposite directions, and connecting the electrode terminals of the cylindrical batteries with each other using connecting members by welding.

The electrical connection between the cylindrical batteries is generally accomplished by spot welding using thin plate-shaped connecting members, such as nickel plates. A protection circuit is connected to the battery core pack constructed in the parallel and/or series connection structure so as to manufacture a battery pack.

Whenever the design of the battery pack is changed, however, the connecting members must be modified such that the connecting members are suitable for the changed design of the battery pack. As a result, the manufacturing costs of the battery pack are increased. This problem may occur even when the electrical connection between general batteries, such as prismatic batteries, is performed.

SUMMARY OF THE INVENTION

Therefore, the present invention has been made to solve the above problems, and other technical problems that have yet to be resolved.

Specifically, it is an object of the present invention to provide a method of manufacturing a battery core pack having a plurality of unit cells, especially a plurality of cylindrical batteries, wherein the structure of the battery core pack is easily modified by changing the combination of connecting members having specific constructions.

It is another object of the present invention to provide a connecting member assembly comprising various kinds of connecting members that can be specially combined to perform the battery core pack manufacturing method.

In accordance with an aspect of the present invention, the above and other objects can be accomplished by the provision of a method of manufacturing a battery core pack having two or more unit cells connected in parallel with each other and two or more unit cells connected in series with each other, wherein the battery core pack is manufactured through the combination of a first connecting member having a connection part for connection with a protection circuit, the connection part extending from the outer surface of a plate body of the first connecting member; a second connecting member having a connection part for connection with the protection circuit, the connection part extending from the left or right outer surface of a plate body of the second connecting member, and a bending guide groove formed at the upper edge and/or the lower edge of the middle of the plate body of the second connecting member; and a third connecting member having a connection part for connection with the protection circuit, the connection part extending from the outer surface of a plate body of the third connecting member adjacent to the middle of the plate body of the third connecting member, and a bending guide groove formed at the upper edge and/or the lower edge of the middle of the plate body of the third connecting member, whereby the first connecting member is used when the unit cells are connected only in the lateral direction according to the construction of the battery core pack, and the second connecting member and/or the third connecting member are used when the unit cells are connected in the lateral direction and, at the same time, in the longitudinal direction according to the construction of the battery core pack.

According to the present invention, it is possible to manufacture a battery core pack in various structures in which a plurality of unit cells, especially a plurality of cylindrical batteries, are connected in parallel or in series with each other through the combination of the three kinds of connecting members. Consequently, the structure of the battery core pack can be easily modified by merely changing the combination of the connecting members without manufacturing additional connecting members, whereby common use of the connecting members is possible.

In a preferred embodiment, the first connecting member, the second connecting member, and/or the third connecting member may be provided at the plate bodies thereof with slits, by which the connecting members can be easily welded to electrode terminals of the unit cells.

Preferably, the connecting members are nickel plates. Each nickel plate is a thin plate made of pure nickel or a thin plate made of copper and plated with nickel.

As described above, the first connecting member is used to electrically connect the unit cells arranged in the lateral direction. Preferably, the unit cells arranged in the lateral direction are connected in parallel with each other. On the other hand, the second connecting member and the third connecting member are used to electrically connect the unit cells arranged in the lateral direction and, at the same time, in the longitudinal direction. Preferably, the unit cells arranged in the lateral direction are connected in parallel with each other, and the unit cells arranged in the longitudinal direction are connected in series with each other.

The reason why the second and third connecting members, which have different structures are selectively or simultaneously used to connect the unit cells arranged in the lateral direction and in the longitudinal direction is that it is necessary to bend the second connecting member and the third connecting member in opposite directions when unit cells or banks are connected in 3S or more series connection structure, and it is preferable to mount the connecting members, such that the connection parts of the connecting members are arranged in line at the outer circumference of the battery core pack, so as to minimize the connection length between a protection circuit and the battery core pack when the protection circuit is connected to the battery core pack, as will be described with reference to the accompanying drawings.

Consequently, the connection parts are not particularly restricted so long as the connection parts are vertically bent downward such that the connection parts can be brought into tight contact with the outer circumferential surfaces of the unit cells while the respective connecting members are fixed to the electrode terminals of the unit cells or the banks by spot welding.

When the unit cells or the banks are arranged in the lateral direction to manufacture a battery core pack, the connection parts are preferably formed at an angle of 30 to 150 degrees to the plate bodies of the connecting members such that the connection parts of the respective connecting members are exposed from the upper end or the lower end of the battery core pack. When the tilt angle of the connection parts is too small or too large, some of the connection parts are located on the inner parts of the outer circumferences of the unit cells with the result that it is difficult to accomplish the connection between the protection circuit and the connection parts.

In a preferred embodiment, the connection parts of the first and second connecting members are formed at an angle of 30 to 60 degrees to the ends of the plate bodies of the first and second connecting members, and the connection part of the third connecting member is formed at an angle of 120 to 150 degrees to the end of the plate body of the third connecting member.

More preferably, the connection parts of the first and second connecting members are formed at the same angle (e.g., 45 degrees), and the connection part of the third connecting member is formed at an angle (e.g., 135 degrees) symmetrical to the angle of the connection parts of the first and second connecting members.

The bending guide grooves formed at the upper edges and/or the lower edges of the middles of the plate bodies of the second and third connecting members are provided by reducing the width of the plate bodies of the second and third connecting members such that the plate bodies of the second and third connecting members can be easily bent when the unit cells or the banks are arranged in the longitudinal direction while the plate bodies of the second and third connecting members are welded to the unit cells or the banks. Preferably, the bending guide grooves are formed at the upper edges and/or the lower edges of the middles of the plate bodies of the second and third connecting members in a symmetrical fashion.

In a preferred embodiment, the connection parts of the connecting members are provided with bending guide grooves, by which the connection parts of the connecting members are vertically bent with ease.

The connection between the unit cells or the banks and the connecting members is accomplished by spot welding. As previously described, the slits are formed in the plate bodies at the positions where the plate bodies are brought into contact with the electrode terminals of the unit cells or the banks. Consequently, effectiveness of spot welding is improved.

Generally, the cylindrical battery, which is one of typical batteries, has a cathode terminal protruding from one end thereof, and the entire battery case of the cylindrical battery serves as an anode terminal, which is isolated from the cathode terminal. Consequently, when cathode terminals of the unit cells arranged in the lateral direction, i.e., the banks, are connected in parallel with each other, it is preferable that the connecting members be welded to electrode terminals of the banks while insulating sheets covering the upper ends of the banks are disposed between the cathode terminals of the banks and the connecting member such that only the cathode terminals of the banks can be exposed.

Also preferably, insulating sheets are disposed between the connection parts and cases of the unit cells for preventing the connection parts from contacting the cases of the unit cells. The insulating sheets for connection part insulation may be previously attached to the outer circumferential surfaces of the unit cells where the connection parts are located when the connecting members are connected to the corresponding electrode terminals of the banks.

The battery core pack can be manufactured in various structures including parallel and series connection structures through the combination of the connecting members. For example, the battery core pack may be constructed in a 2P-3S line-type structure, a 2P-3S plane-type structure, a 2P-4S line-type structure, or a 2P-4S plane-type structure.

In accordance with another aspect of the present invention, there is provided a connecting member assembly comprising first, second, and third connecting members that can be combined to perform the above-described battery core pack manufacturing method. The details of the connecting member assembly have already described in connection with the battery core pack manufacturing method.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
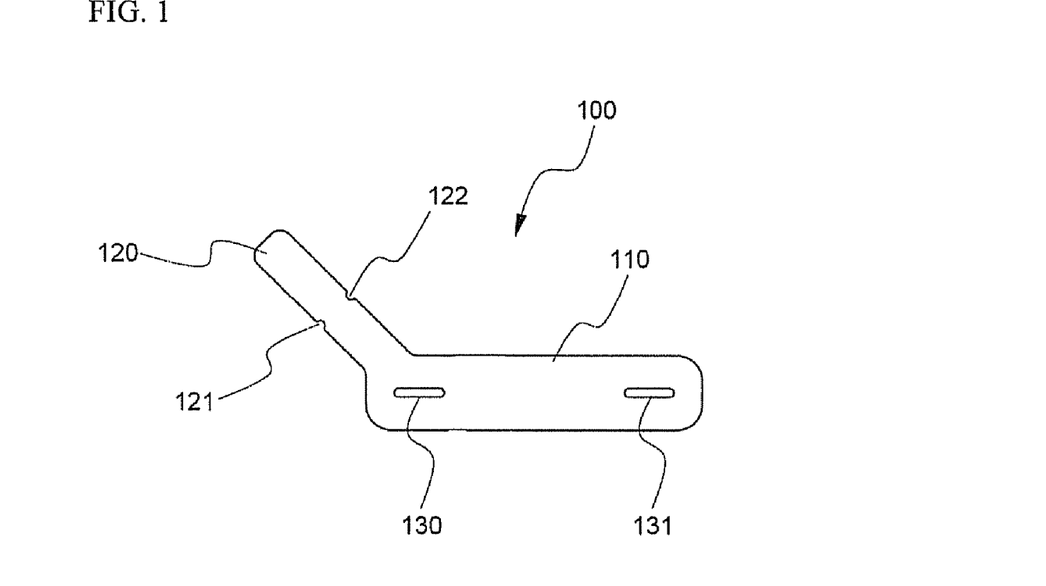
FIG. 1 is a typical view illustrating a first connecting member according to a preferred embodiment of the present invention.
Figure 2:
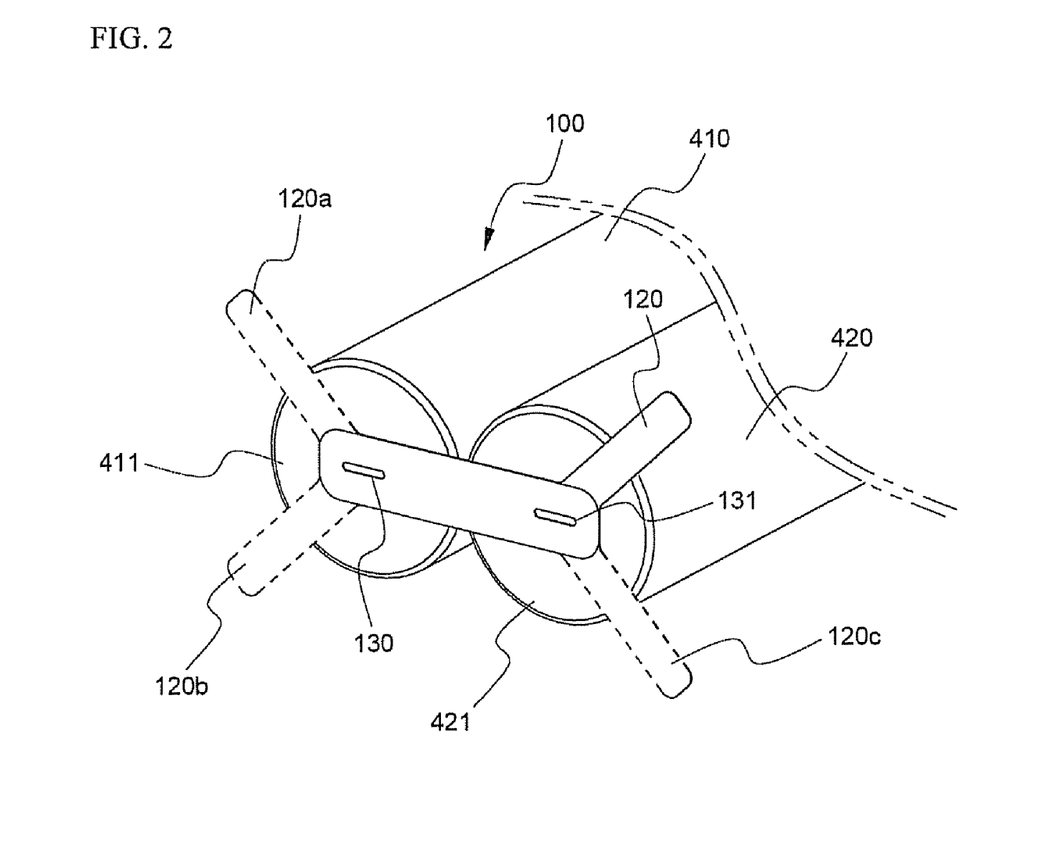
FIG. 2 is a typical view illustrating various connection modes in which the connecting member of FIG. 1 is connected to one side of a bank.

FIG. 1 is a typical view illustrating a first connecting member according to a preferred embodiment of the present invention, and FIG. 2 is a typical view illustrating various connection modes in which the connecting member of FIG. 1 is connected to one side of a bank.

Referring to these drawings, the first connecting member 100 includes a connection part 120 extending from one end of a plate body 110, and slits 130 and 131 formed in the plate body 110 at predetermined positions adjacent to opposite ends of the plate body 110. Specifically, the slits 130 and 131 are formed at positions corresponding to electrode terminals 411 and 421 of first and second unit cells 410 and 420 constituting a bank 400. Consequently, effectiveness of spot welding is improved. The connection part 120 extends from the plate body 110 while the connection part 120 is at an angle of approximately 45 degrees to the plate body 110. At the middle of the connection part 120 are formed a pair of bending guide grooves 121 and 122.

As indicated by a solid line and dotted lines in FIG. 2, the connection part 120 may be located on the bank 400 at four different positions 120, 120a, 120b, and 120c depending upon in which mode the first connecting member 100 is welded to the electrode terminal of the bank 400.

Figure 3:
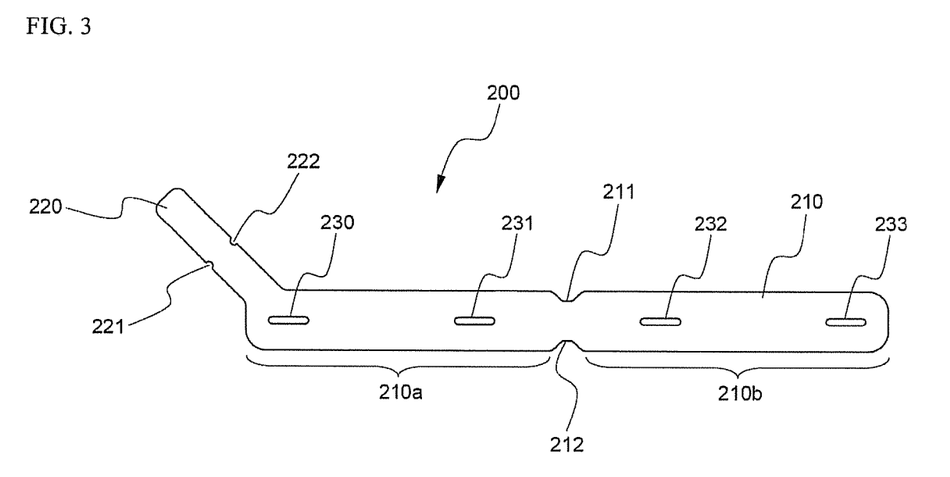
FIG. 3 is a typical view illustrating a second connecting member according to a preferred embodiment of the present invention.
Figure 4:
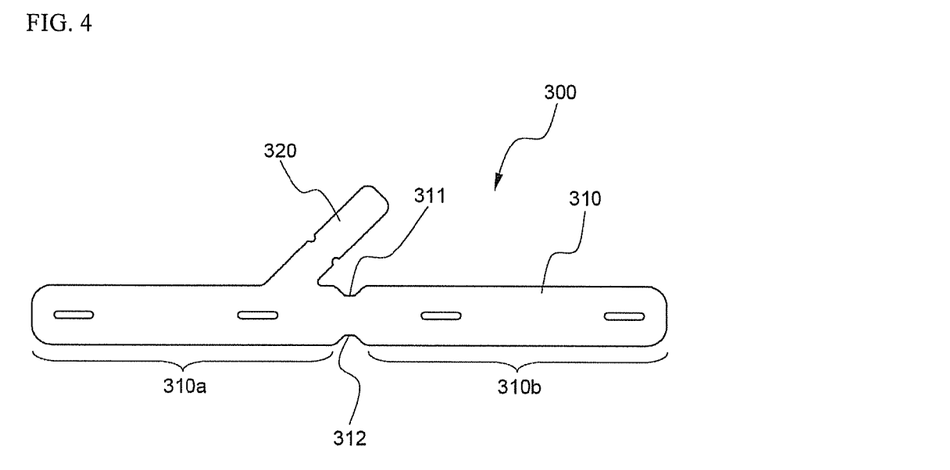
FIG. 4 is a typical view illustrating a third connecting member according to a preferred embodiment of the present invention.

FIG. 3 is a typical view illustrating a second connecting member according to a preferred embodiment of the present invention, and FIG. 4 is a typical view illustrating a third connecting member according to a preferred embodiment of the present invention.

Referring first to FIG. 3, the second connecting member 200 includes a connection part 220 extending from one end of a plate body 210, which is twice the length of the plate body of the first connecting member of FIG. 1. At the middle of the connection part 220 are formed a pair of bending guide grooves 221 and 222.

Slits 230 and 233 are formed in the plate body 210 at predetermined positions adjacent to opposite ends of the plate body 210. In addition, slits 231 and 232 are formed in the plate body 210 at predetermined positions adjacent to the middle of the plate body 210. At opposite edges of the middle of the plate body 210 are formed a pair of bending guide grooves 211 and 212. The plate body 210 is divided into a left body part 210a and a right body part 210b from the bending guide grooves 211 and 212. Consequently, a bank a (not shown) connected to the left body part 210a and another bank b (not shown) connected to the right body part 210b are bent about the bending guide grooves 211 and 212. For example, when the bank b is bent at an angle of 180 degrees to the bank a, the banks a and b are arranged in the longitudinal direction. Also, the electrode terminals of the banks a and b have opposite polarities. Consequently, the unit cells of the respective banks a and b are connected in parallel with each other by the second connecting member 200, and, at the same time, the banks a and b, which are connected to the left and right body parts 210a and 210b, respectively, are connected in series with each other by the second connecting member 200.

The third connecting member 300 of FIG. 4 is identical in the structure to the second connection member 200 of FIG. 3 except that a connection part 320 is formed adjacent to the middle of a plate body 310, i.e., at a predetermined position of a left body part 310a adjacent to bending guide grooves 311 and 312, and the connection part 320 of the third connecting member 300 is inclined such that the connection part 320 of the third connecting member 300 is symmetrical to connection part 220 of the second connecting member 200.

Figure 5:
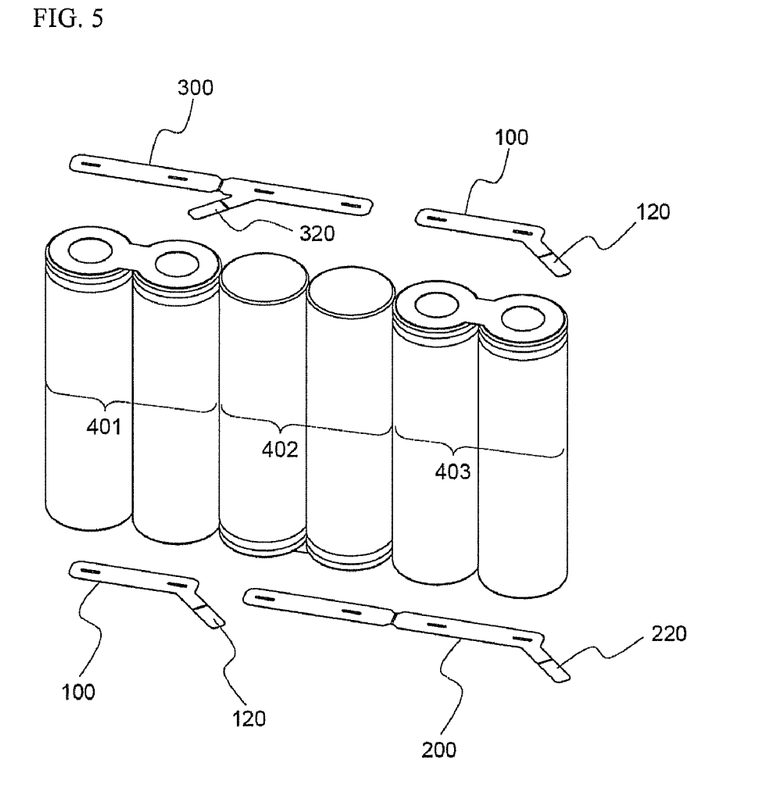
FIGS. 5 to 9 are views illustrating steps of a process for manufacturing a battery core pack in a 2P-3S line-type structure according to a preferred embodiment of the present invention.
Figure 6:
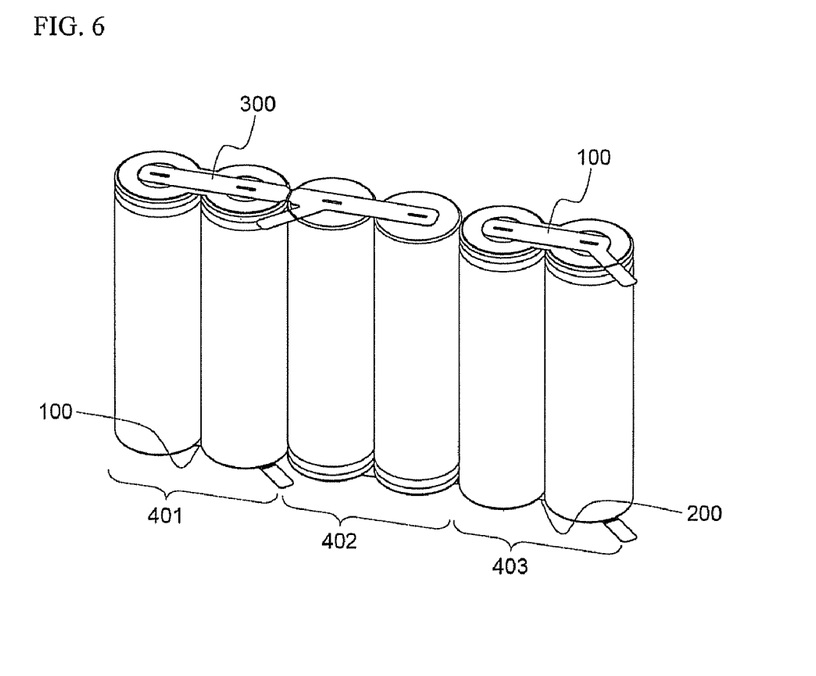
Figure 7:
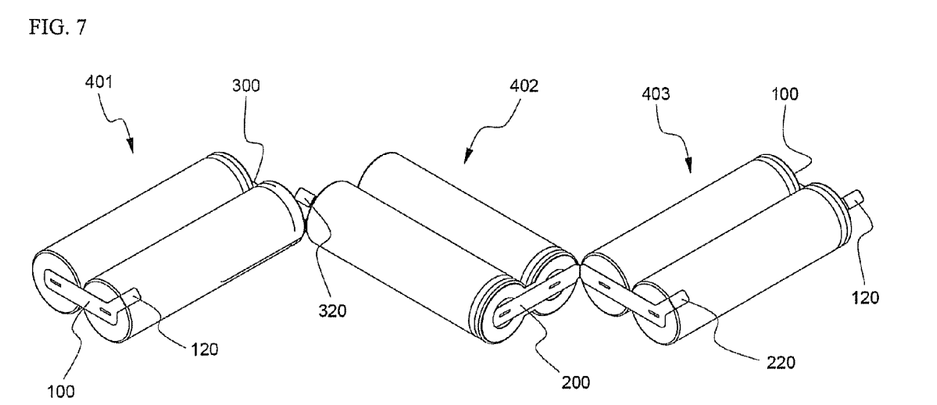
Figure 8:
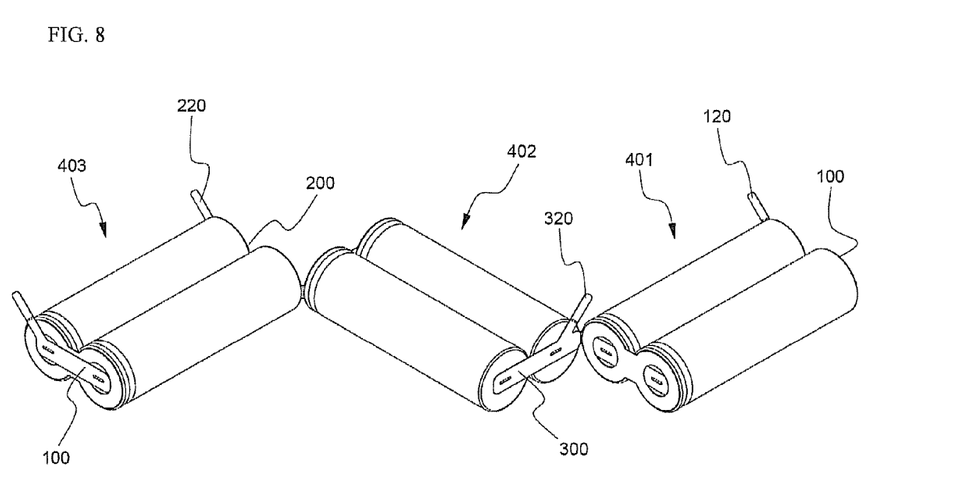

FIGS. 5 to 9 are views typically illustrating steps of a process for manufacturing a battery core pack in a 2P-3S line-type structure according to a preferred embodiment of the present invention. FIGS. 7 and 8 show the same step. For convenience of understanding, connection of banks at opposite sides is illustrated in FIGS. 7 and 8.

Referring first to FIG. 5, a total of 6 cylindrical batteries used as unit cells are arranged in the lateral direction so as to constitute three banks 401, 402 and 403. The first bank 401 and the third bank 403 are positioned with the cathode terminals of the first and third banks 401 and 403 up. On the other hand, the second bank 402 is positioned with the anode terminal of the second bank 402 up.

A first connecting member 100 is placed on the lower-end anode terminal of the first bank 401, and a third connecting member 300 is placed on the upper-end cathode terminal of the first bank 401 while an insulating sheet 500 is disposed between the third connecting member 300 and the upper-end cathode terminal of the first bank 401. The third connecting member 300 is also placed on the upper-end anode terminal of the second bank 402. A second connecting member 200 is placed on the lower-end cathode terminal of the second bank 402 while an insulating sheet 501 is disposed between the second connecting member 200 and the lower-end cathode terminal of the second bank 402. The second connecting member 200 is also placed on the lower-end anode terminal of the third bank 403. Another connecting member 100 is placed on the upper-end cathode terminal of the third bank 403 while an insulating sheet 502 is disposed between the first connecting member 100 and the upper-end cathode terminal of the third bank 403. The connection parts 120, 220, and 320 of the connecting members 100, 200, and 300 are disposed such that the connection parts 120, 220, and 320 face forward.

Referring to FIG. 6, a spot welding operation is performed, while the connecting members 100, 200, and 300 are disposed on the corresponding positions of the banks, such that the two unit cells of the respective banks 401, 402, and 403 are connected in parallel with each other and the banks 401, 402, and 403 are connected in series with each other. Consequently, a total of 6 unit cells constitute a 2P-3S type battery core pack.

Referring to FIGS. 7 and 8, the second connecting member 200 and the third connecting member 300 are vertically bent about the middles thereof such that the banks 401, 402, and 403 are spread. The first bank 401 and the second bank 402 are connected with each other by the third connecting member 300 and the second bank 402 and the third bank 403 are connected with each other by the second connecting member 200. Consequently, the connection parts 220 and 320 are located in the same direction as the connection parts 120 of the first connecting members 100, although the second connecting member 200 and the third connecting member 300 are bent in opposite directions.

Figure 9:
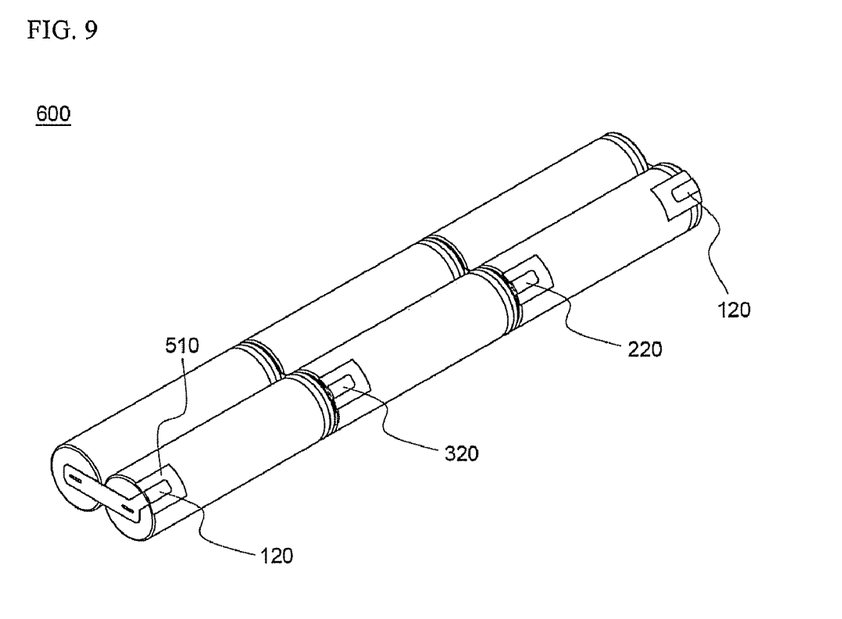

Referring finally to FIG. 9, after the corresponding connecting members are bent such that the banks 401, 402, and 403 are fully spread, the connection parts 120, 220, and 320 are vertically bent downward, such that the connecting parts 120, 220, and 320 can be brought into tight contact with battery cases of the unit cells, while insulating sheets 510 are attached to predetermined positions of the battery cases corresponding to the connection parts 120, 220, and 320. As a result, a battery core pack is manufactured in a 2P-3S line-type structure. Since the connection parts 120, 220, and 320 are arranged in line at the outer circumference of the battery core pack 600, the connection parts 120, 220, and 320 of the battery core pack 600 can be connected to a protection circuit by the shortest distance. The connection between the connection parts 120, 220, and 320 of the battery core pack 600 and the protection circuit is performed by soldering.

Figure 10:
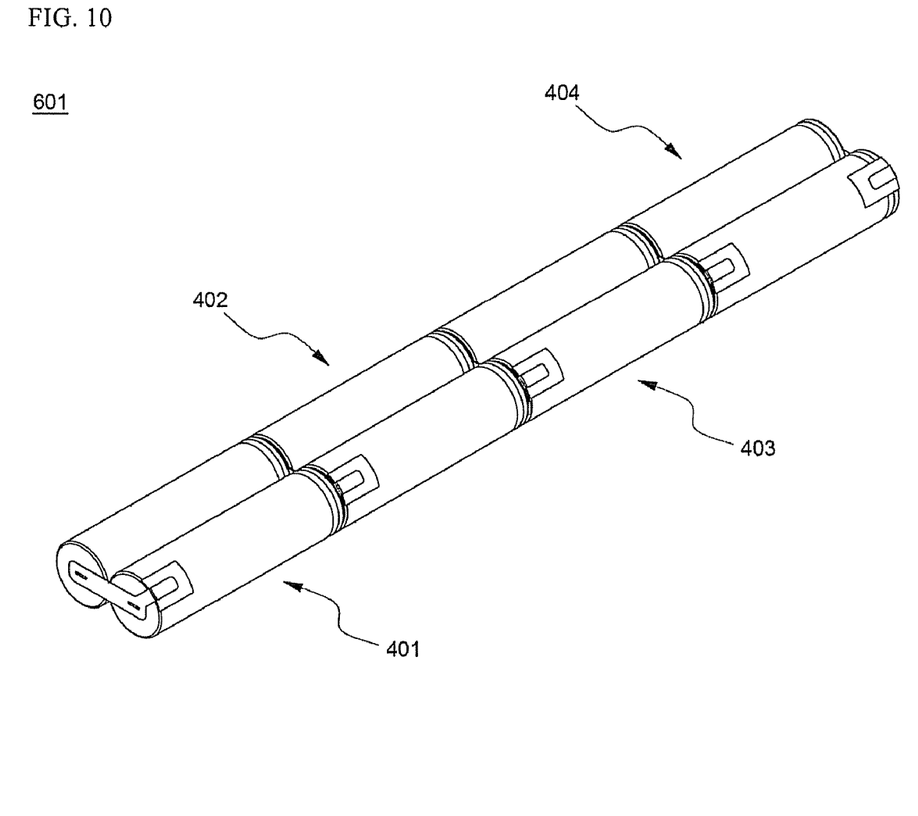
FIG. 10 is a typical view illustrating a battery core pack manufactured in a 2P-4S line-type structure according to a preferred embodiment of the present invention.

FIG. 10 is a typical view illustrating a battery core pack manufactured in a 2P-4S line-type structure according to a preferred embodiment of the present invention.

The battery core pack 601 of FIG. 10 can be manufactured by the same method as the battery core pack 600 of FIG. 9 except that the battery core pack 601 further includes a fourth bank 404, and the electrical connection between the third bank 403 and the fourth bank 404 is accomplished by the third connecting member 300.

Figure 11:
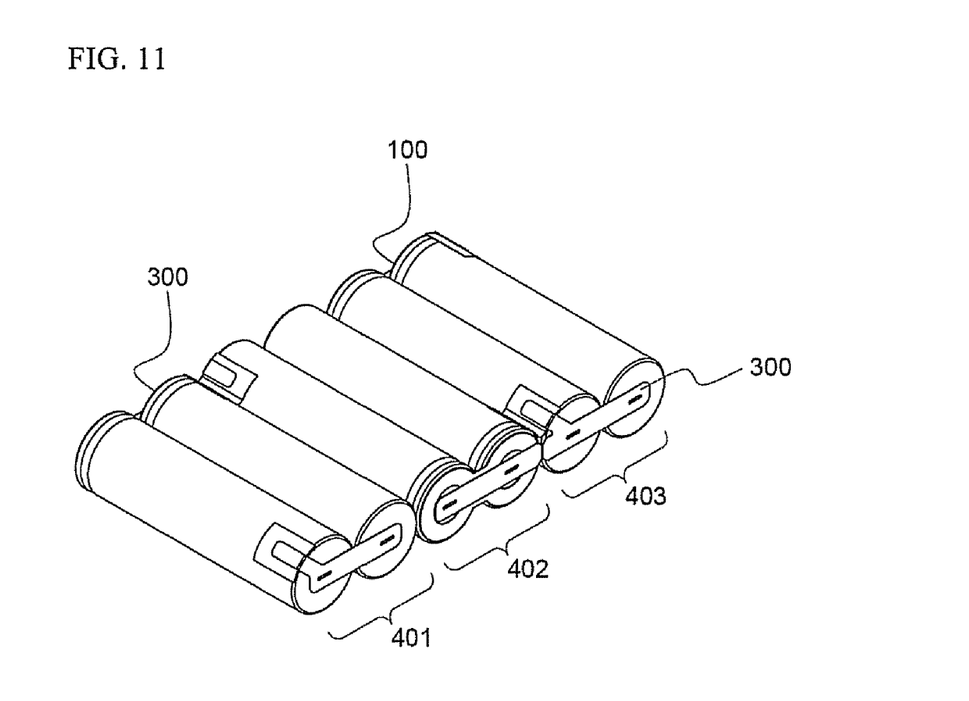
FIG. 11 is a typical view illustrating a battery core pack manufactured in a 2P-3S plane-type structure according to another preferred embodiment of the present invention.
Figure 12:
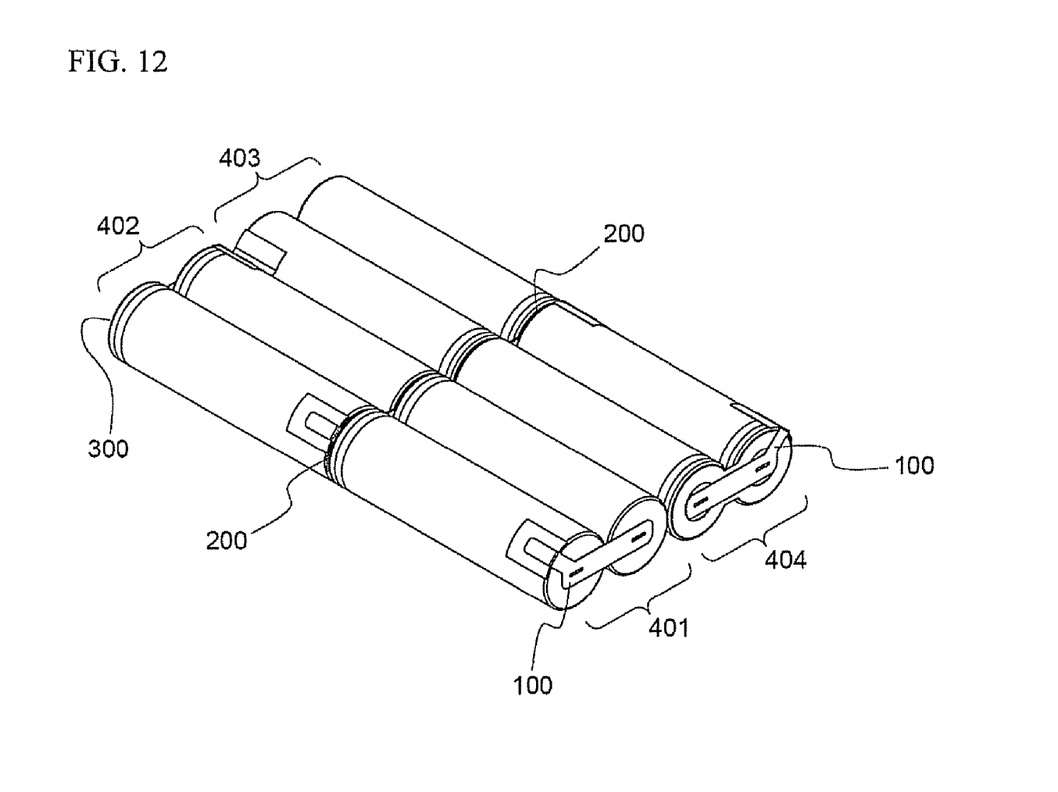
FIG. 12 is a typical view illustrating a battery core pack manufactured in a 2P-4S plane-type structure according to yet another preferred embodiment of the present invention.

FIG. 11 is a typical view illustrating a battery core pack manufactured in a 2P-3S plane-type structure according to another preferred embodiment of the present invention, and FIG. 12 is a typical view illustrating a battery core pack manufactured in a 2P-4S plane-type structure according to yet another preferred embodiment of the present invention.

The battery core pack 700 of FIG. 11 is manufactured by electrically connecting the first bank 401 and the second bank 402 with each other using a third connecting member 300 and electrically connecting the second bank 402 and the third bank 403 with each other using another third connecting member 300 while the third connecting members 300 are not bent. According to circumstances, the electrical connection between the banks may be accomplished using the second connecting members.

The battery core pack 701 of FIG. 12 is manufactured by electrically connecting the first bank 401 and the second bank 402 with each other using a second connecting member 200, which is bent, electrically connecting the second bank 402 and the third bank 403 with each other using a third connecting member 300, which is not bent, and electrically connecting the third bank 403 and the fourth bank 404 with each other using another second connecting member 200, which is bent. According to circumstances, the third connecting members 300 may be used instead of the second connecting members 200, and the second connecting member 200 may be used instead of the third connecting member 300. Such replacement is partially shown in the drawing. Also, the connection parts 120, 220, and 320 of the connecting members 100, 200, and 300 are placed on the upper part of the outer circumference of the battery core pack 701. When connecting members, each having a connection part extending from the plate body at an angle of 90 degrees to the plate body, are used, the connection parts may be arranged in line on the upper part of the outer circumference of the battery core pack 701.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, it is possible to manufacture a battery core pack in various structures in which a plurality of unit cells, especially a plurality of cylindrical batteries, are connected in parallel or in series with each other through the combination of three kinds of connecting members. Consequently, the structure of the battery core pack can be easily modified by merely changing the combination of the connecting members without manufacturing additional connecting members, whereby common use of the connecting members is possible.

What is claimed is:

1. A method of manufacturing a battery core pack having two or more unit cells connected in parallel with each other and two or more unit cells connected in series with each other, wherein the battery core pack is manufactured through the combination of a first connecting member having a connection part extending from the outer surface of a plate body of the first connecting member;

a second connecting member having a connection part extending from the left or right outer surface of a plate body of the second connecting member, and a bending guide groove formed at the upper edge and/or the lower edge of the middle of the plate body of the second connecting member; and a third connecting member having a connection part extending from the outer surface of a plate body of the third connecting member adjacent to the middle of the plate body of the third connecting member, and a bending guide groove formed at the upper edge and/or the lower edge of the middle of the plate body of the third connecting member, whereby the first connecting member is used when the unit cells are connected only in the lateral direction according to the construction of the battery core pack, and the second connecting member and/or the third connecting member are used when the unit cells are connected in the lateral direction and, at the same time, in the longitudinal direction according to the construction of the battery core pack.

2. The method according to claim 1, wherein the unit cells are cylindrical batteries.

3. The method according to claim 1, wherein one or more connecting members, selected from a group consisting of the first connecting member, the second connecting member, and the third connecting member, are provided at the plate bodies thereof with slits, by which the connecting members can be easily welded to electrode terminals of the unit cells.

4. The method according to claim 1, wherein the connecting members are nickel plates.

5. The method according to claim 1, wherein the unit cells arranged in the lateral direction are connected in parallel with each other, and the unit cells arranged in the longitudinal direction are connected in series with each other.

6. The method according to claim 1, wherein the connection parts are formed at an angle of 30 to 150 degrees to the plate bodies.

7. The method according to claim 1, wherein the connection parts of the first and second connecting members are formed at an angle of 30 to 60 degrees to the ends of the plate bodies of the first and second connecting members, and the connection part of the third connecting member is formed at an angle of 120 to 150 degrees to the end of the plate body of the third connecting member.

8. The method according to claim 1, wherein the connection parts of the first and second connecting members are formed at the same angle, and the connection part of the third connecting member is formed at an angle symmetrical to the angle of the connection parts of the first and second connecting members.

9. The method according to claim 1, wherein the connection parts of the connecting members are provided with bending guide grooves, by which the connection parts of the connecting members are vertically bent with ease.

10. The method according to claim 1, wherein, when cathode terminals of banks constituted by the unit cells are connected in parallel with each other, the connecting members are welded to electrode terminals of the banks while insulating sheets covering the upper ends of the banks are disposed between the cathode terminals of the banks and the connecting member such that only the cathode terminals of the banks can be exposed.

11. The method according to claim 1, wherein insulating sheets are disposed between the connection parts and cases of the unit cells for preventing the connection parts from contacting the cases of the unit cells.

12. The method according to claim 1, wherein the battery core pack is constructed in a 2P-3S line-type structure, a 2P-3S plane-type structure, a 2P-4S line-type structure, or a 2P-4S plane-type structure.

* * * * *